Jan. 14, 1930.     A. M. GEREMIA     1,743,713
AUTOMATIC WINDSHIELD WIPER
Filed July 2, 1928
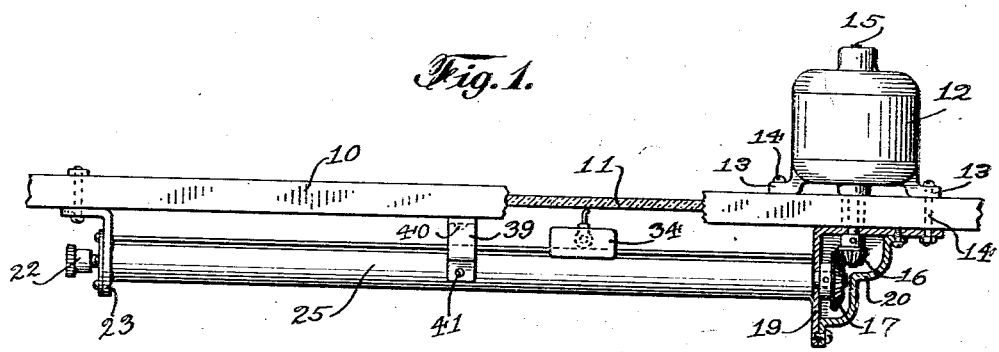
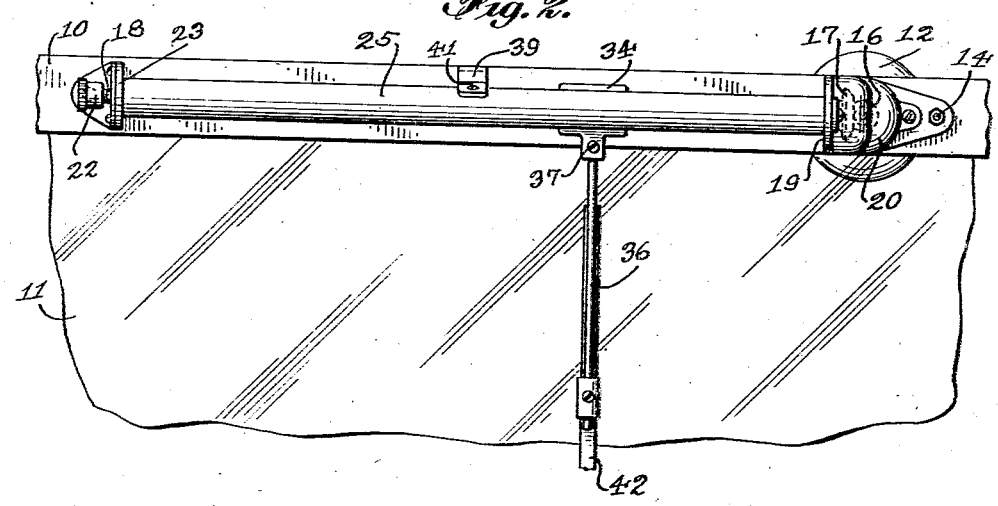
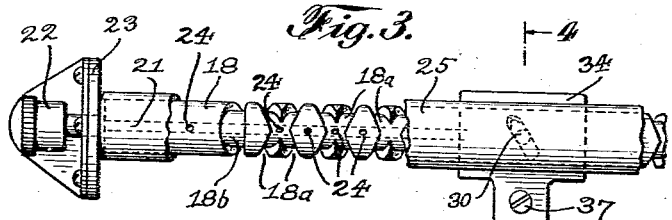
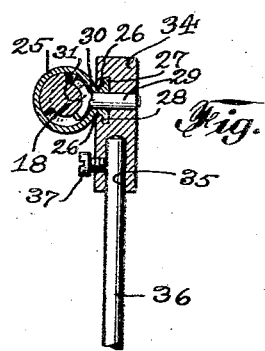
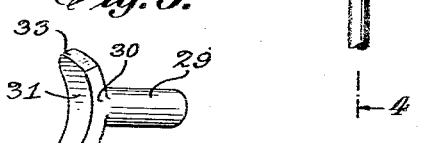
INVENTOR
Alexander M. Geremia
BY W. G. Manning
ATTORNEY Patented Jan. 14, 1930

1,743,713

UNITED STATES PATENT OFFICE

ALEXANDER M. GEREMIA, OF WATERBURY, CONNECTICUT

AUTOMATIC WINDSHIELD WIPER

Application filed July 2, 1928. Serial No. 289,662.

This invention relates to windshield wipers, and more particularly to a wiper of the reciprocating type having a blade member adapted to pass back and forth over the full width of the windshield.

One object of this invention is to provide a windshield wiper of the above nature which will be operated by an electric motor which is so located as not to obstruct the vision of the driver.

A further object is to provide a device of the above nature in which the wiper blade is reciprocated by an improved form of shoe member which is driven by a rapidly rotating cross-threaded screw rod.

A further object is to provide a reciprocating windshield wiper of the above nature in which the screw rod is surrounded by a casing and is automatically supplied with lubricant from its interior.

A further object is to provide a windshield wiper of the above nature which will be simple in construction, inexpensive to manufacture, practically silent in operation, easy to install, ornamental in appearance, and very efficient and durable in use.

With these and other objects in view there has been illustrated on the accompanying drawings one form in which the invention may be conveniently embodied in practice.

Fig. 1 represents a fragmentary top view, partly in section, of the improved windshield wiper.

Fig. 2 is a fragmentary front view of the same.

Fig. 3 is a fragmentary front view of the same on an enlarged scale.

Fig. 4 is a sectional view of the same taken along the line 4—4 of Fig. 3.

Fig. 5 is a perspective view of the T-shaped guiding shoe.

Referring now to the drawings in which like reference numerals denote corresponding parts throughout the several views, the numeral 10 indicates a windshield frame having a glass windshield 11 mounted therein. On the rear of the windshield frame at a position out of line with the driver's vision, provision is made of an electric motor 12, said motor having attaching feet 13 secured to the windshield frame 10, as by bolts 14.

The motor 12 has a shaft 15 adapted to be driven continuously by current derived from any suitable source, such as a storage battery, not shown. The motor shaft 15 passes forwardly through the windshield frame 10 and is provided on its forward end with a bevel gear 16 adapted to mesh with a larger bevel gear 17 secured on the end of a hollow screw rod 18. The bevel gears 16 and 17 are preferably protected from dust, moisture, etc., by an angle-shaped casing member 19 secured to the front of the windshield frame 10 and having a detachable W-shaped cover 20, as clearly shown in Figs. 1 and 2.

In order to reciprocate a windshield wiper 42 over the front surface of the windshield 11, the screw rod 18 is provided with a pair of crossed helical tracks 18$^a$ extending throughout substantially its entire length, said tracks serving to reciprocate a wiper-actuating T-shaped shoe member 30, most clearly shown in Fig. 5. Near both ends of the screw rod 18 the tracks 18$^a$ are joined by reversing grooves 18$^b$, one of which is clearly shown at the left in Fig. 3. The screw rod 18 is preferably provided with a bore 21 for receiving a supply of grease or other suitable lubricant from a grease cup 22, said grease cup 22 being preferably screwed on one end of the screw rod 18 at the left of an angular supporting bracket 23.

The screw rod 18 is provided along its length with a plurality of spaced radial apertures 24 communicating with the bore 21 for permitting the internal lubricant to pass out therethrough. The screw rod 18 is enclosed by a tubular protective casing 25 which is provided at its rear with a pair of parallel wing sections 26 having oppositely extending vertical flanges 27 and 28, the slot between said sections 26 serving to slidably receive the shank 29 of the T-shaped shoe member 30. The shoe member 30 has an arcuate base 31, the sides of which are parallel to each other for fitting within the helical tracks 18$^a$ of the screw rod 18. The base 31 of the shoe member 30 has a square rear end 32 and a wedge-shaped forward end 33. By means of this construction it will be seen that the shoe member 31 is irreversible; i. e. it can travel in the helical tracks 18ᵃ of the screw rod 18 only in the direction of its wedge-shaped forward end 33.

The shank 29 of the shoe member 30 is swiveled in a vertical block 34 which has a pair of angular slots on its forward face shaped to slidably fit over the vertical flanges 27 and 28 of the casing wing sections 26. The block 34 has a socket 35 in its lower end for receiving a depending wiper-holding rod 36, said rod being held detachably in position by a set screw 37. The casing 25 is attached to the upper part of the windshield frame 10 by the casing member 19, the angular bracket 23, and a Z-shaped bracket 39, the latter being secured to the center of said windshield frame, as by screws 40 and 41.

In operation, when the current is turned on, the electric motor 12 through the bevel gears 16 and 17 will rotate the screw rod 18 at high speed continuously in one direction. This will cause the T-shaped shoe member 30 to move rapidly back and forth carrying with it the windshield wiper 42 which will reciprocate over the front surface of the windshield 10.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a windshield wiper of the reciprocating type, a casing for attachment to a windshield frame, a screw rod having a pair of continuous oppositely extending helical grooves mounted to rotate in said casing, means for driving said screw rod at high speed, said casing having a pair of horizontal side wings having vertical flanges defining a slot therebetween, a shoe member extending through said slot into said tracks, and a wiper-holding block having recesses for fitting about said flanges, said shoe member being swiveled in said block.

2. In a windshield wiper of the reciprocating type, a casing for attachment to a windshield frame, a screw rod having a pair of continuous oppositely extending helical grooves mounted to rotate in said casing, means for driving said screw rod at high speed, said casing having a slot in its rear for guiding a reciprocating wiper-holding shoe, said screw rod being hollow, and means to automatically supply lubricant from the interior of said screw rod to the exterior thereof.

3. In a windshield wiper of the reciprocating type, a casing for attachment to a windshield frame, a screw rod having a pair of continuous oppositely extending helical grooves mounted to rotate in said casing, means for driving said screw rod at high speed, said casing having a slot in its rear for guiding a reciprocating wiper-holding shoe, said screw rod being hollow, and means to automatically supply lubricant to the interior of said screw rod, said hollow screw rod having a series of perforations along its length to permit the lubricant to flow out upon the exterior surface of said screw rod within said casing.

In testimony whereof, I have affixed my signature to this specification.

ALEXANDER M. GEREMIA.